3,019,268
NITROBENZYLTHIOETHANOL COMPOUNDS
Saul R. Buc, Easton, Pa., and David I. Randall, New Vernon, N.J., assignors to General Aniline & Film Corporation, New York, N.Y., a corporation of Delaware
No Drawing. Filed Dec. 8, 1959, Ser. No. 858,037
10 Claims. (Cl. 260—609)

This invention relates to the provision of nitrobenzylthioethanol compounds and more particularly to the provision of a novel group of nitrobenzene compounds containing at least one meta-substituted —$CH_2SCH_2CH_2OH$ (methylenethioethanol, hydroxyethylthiomethyl) group. These compounds have been found to constitute highly desirable intermediates for the preparation of dyestuffs reactive with textile fibers and the like, as will be pointed out more fully below.

The objects and advantages of this invention are accordingly embodied in the provision of a group of compounds which may be broadly described as nitrobenzene compounds containing at least one meta-substituted methylenethioethanol group. In a more specific sense, the compounds of this invention are those having the formula

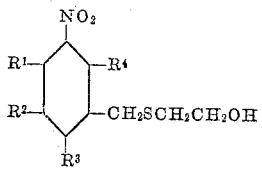

wherein $R^1$, $R^3$ and $R^4$ are selected from the group consisting of H, halogen, lower alkyl and lower alkoxy, and $R^2$ is selected from the group consisting of H, halogen, lower alkyl, lower alkoxy and —$CH_2SCH_2CH_2OH$. In this formula, $R^1$, $R^3$ and $R^4$ may be H, chloro, bromo, methyl, ethyl, methoxy or ethoxy or the like or any combination thereof. $R^2$ may have any of the values defined for $R^1$, $R^3$ and $R^4$ and may also be —$CH_2SCH_2CH_2OH$.

The invention also includes a process for producing a nitrobenzene compound containing at least one meta-substituted methylenethioethanol group comprising reacting one mole of a nitrobenzene compound containing at least one meta-substituted chloromethyl group with a molar amount of mercaptoethanol about equal to the number of chloromethyl groups in said compound, in the presence of an acid binding agent. The invention also resides in a process for producing a compound having the structural formula given above comprising reacting one mole of a compound of the formula

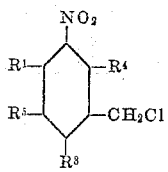

wherein $R^1$, $R^3$ and $R^4$ have the values given above and $R^5$ may have a similar value or may be —$CH_2Cl$, with a molar amount of mercaptoethanol about equal to the number of $CH_2Cl$ groups in said compound, in the presence of an acid binding agent.

As stated above, the reaction requires the use of a molar amount of mercaptoethanol about equal to the number of chloromethyl groups in the chloromethylated nitrobenzene intermediate. Examples of such intermediates are for example disclosed in U.S. 2,768,217. These and other intermediates may generally be prepared by reaction of an appropriately substituted or unsubstituted nitrobenzene compound with a chloromethylating agent such as bischloromethyl ether in the presence of sulfuric acid. Alternatively, chloromethylation of the nitrobenzene compound may be carried out by reaction with formaldehyde, zinc chloride and HCl.

In carrying out the reaction, it is preferred to employ a polar organic solvent for the chloromethylated nitrobenzene intermediate. While methanol is preferred, other suitable solvents may be employed as for example, ethanol, butanol, Cellosolves (lower alkyl and benzyl ethers of ethylene glycol), Carbitols (lower alkyl ethers of diethylene glycol), dioxane, acetone, methyl ethyl ketone, and the like. Sufficient solvent is employed to dissolve the chloromethylated nitrobenzene intermediate.

The reaction takes place at any temperature from room temperature up to about 150° C. or so, although elevated temperatures are preferred to accelerate the reaction. Desirably, a solvent is employed which boils within this range so that the reaction may be carried out at reflux to facilitate temperature control. At elevated temperatures, as stated, the reaction is of minimal duration, ranging from 10 to 30 minutes or the like. Lower temperatures will of course require longer reaction times.

The reaction requires the presence of an acid binding agent to neutralize the HCl liberated during the reaction. Such acid binding agents are well known and those preferred are the alkali metal and alkaline earth metal hydroxides, carbonates, bicarbonates, and the like. The acid binding agents should be employed, as will be apparent to the skilled worker, in amounts molecularly equivalent to the HCl liberated during the reaction. As a further feature of the invention, it has been found that superior results are obtained by first mixing the chloromethylated nitrobenzene intermediate and mercaptoethanol prior to addition of the acid binding agent. By this procedure, the formation of undesirable by-products and other impurities by premature undesired reaction in the reaction medium is minimized or eliminated.

Following completion of the reaction, the m-methylene thioethanol-containing nitrobenzene compound may be readily separated from the reatcion mass by drowning the mass in water and separating the desired product which precipitates or separates as an oil, depending upon the particular compound being produced, its melting point, etc.

As stated above, the products of this invention are surprisingly effective in the production of dyestuffs and other substances reactive with textile fibers. For example, the products of Examples 1 and 2 may be subjected to an oxidation treatment to produce the corresponding hydroxyethylsulfonylmethyl-containing compounds, the nitro group then reduced to the corresponding amino group, and the resulting amino compound reacted with a halogenated dyestuff of the anthraquinone series, azo series, etc. with liberation of a hydrohalide. α-anthraquinone may be employed. Such amino compounds may also be employed in the production of novel reactive phthalocyanine dyestuffs as disclosed in the application of Buc et al., Serial No. 855,550, filed on November 27, 1959. Such dyestuffs are reactive with textile fibers and the like to produce dyeings having unexpectedly improved wash fastness properties and the like. It has been surprisingly found that isomers of the products of this invention containing a methylenethioethanol group or groups in ortho or para position relative to the nitro group are substantially ineffective as suitable intermediates in the production of such dyestuffs.

The following examples are only illustrative of the present invention and are not to be regarded as limitative. All parts and proportions referred to herein are by weight unless otherwise indicated.

EXAMPLES

*Example 1.—2-methoxy-5-nitrobenzylthioethanol*

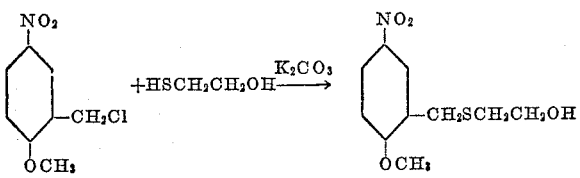

In a stirred flask with reflux condenser and dropping funnel charge 50.5 grams (0.25 mole) 2-methoxy-5-nitrobenzyl chloride and 100 ml. methanol.

Heat to reflux. The chloride dissolves. Add 19 ml. (0.27 mole) mercaptoethanol.

Drop into the refluxing solution a solution of 18.0 g. $K_2CO_3$ (0.13 mole) in 21.0 ml. water.

The carbonate reacts instantly with evolution of $CO_2$ and precipitation of KCl. The addition requires 10 minutes. Refluxing is continued 15 minutes and the mixture is drowned in water. The product separates as an oil which crystallizes rapidly. The yield is substantially quantitative.

The product may be crystallized from benzene and then melts at 81–83° C.

*Analysis.*—Calculated for $C_{10}H_{13}NO_4S$: C=49.37; H=5.38. Found: C=49.24; H=5.66.

*Example 2.—5-nitrohemimellitylene-$\alpha^1,\alpha^3$-bis-thioethanol*

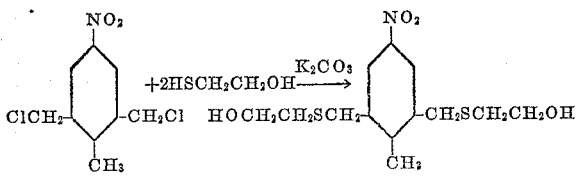

Charge, as in Example 1, 234 g. (1.0 mole) $\alpha^1,\alpha^3$-dichloro-5-nitrohemimellitene,
141 ml. (2.01 moles) mercaptoethanol, and
400 ml. methanol.

Heat to reflux, drop in a solution of 139 g. $K_2CO_3$ dissolved in
140 ml. $H_2O$.

Reflux 15 minutes after the end of the addition. Drown in water, filter product, wash well with water. The yield is substantially quantitative. The products melt at 98–99° C. It may be crystallized from n-butanol and melts at 102–103° C. when pure.

As examples of other chloromethylated nitrobenzene compounds which may be reacted with mercaptoethanol for the production of the desired products, as above described, there may be mentioned 4-methoxy-3-nitrobenzyl chloride, 2-methyl-5-nitrobenzyl chloride, 4-methyl-3-nitrobenzyl chloride, 6 - nitro - $\alpha^2,\alpha^4$-dichloro-pseudocumene, 3-chloro-4-methyl-5-nitrobenzyl chloride, 3-chloro-6-methyl-5-nitrobenzyl chloride, 2-ethoxy-5-nitrobenzyl chloride, and 4-ethoxy-3-nitrobenzyl chloride.

This invention has been disclosed with respect to certain preferred embodiments, and various modifications and variations thereof will become obvious to persons skilled in the art and are intended to be included within the spirit and scope of this invention.

We claim:
1. A compound of the formula

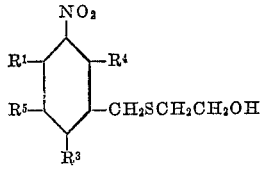

wherein $R^1$, $R^3$ and $R^4$ are selected from the group consisting of H, halogen, lower alkyl and lower alkoxy, and $R^2$ is selected from the group consisting of H, chlorine, bromine, lower alkyl, lower alkoxy and

—$CH_2SCH_2CH_2OH$

2. A compound as defined in claim 1 wherein $R^3$ is —$OCH_3$, and $R^1$, $R^2$ and $R^4$ are H.
3. A compound as defined in claim 1 wherein $R^3$ is —$CH_3$, $R^2$ is —$CH_2SCH_2CH_2OH$, and $R^1$ and $R^4$ are H.
4. A process for producing a compound as defined in claim 1 comprising reacting one mole of a compound of the formula

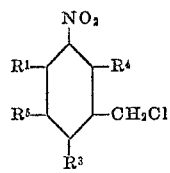

wherein $R^1$, $R^3$ and $R^4$ are selected from the group consisting of H, chlorine, bromine, lower alkyl and lower alkoxy, and $R^5$ is selected from the group consisting of H, halogen, lower alkyl, lower alkoxy, and —$CH_2Cl$, with a molar amount of mercaptoethanol about equal to the number of —$CH_2Cl$ groups in said compound, in the presence of an acid binding agent.
5. A process as defined in claim 4 carried out in a polar organic solvent for said compound.
6. A process for producing a compound as defined in claim 2 comprising reacting one mole of 2-methoxy-5-nitrobenzyl chloride with about one mole of mercaptoethanol in the presence of an acid binding agent.
7. A process as defined in claim 6 carried out in a polar organic solvent for the said nitrobenzyl chloride.
8. A process for producing a compound as defined in claim 3 comprising reacting one mole of 2,6-bischloromethyl-4-nitro-toluene with about two moles of mercaptoethanol in the presence of an acid binding agent.
9. A process as defined in claim 8 carried out in a polar organic solvent for the said nitrotoluene.
10. A process as defined in claim 4 wherein the acid binding agent is added to a mixture of said compound and mercaptoethanol.

No references cited.

UNITED STATES PATENT OFFICE
CERTIFICATION OF CORRECTION

Patent No. 3,019,268                                        January 30, 1962

Saul R. Buc et al.

It is hereby certified that error appears in the above numbered patent requiring correction and that the said Letters Patent should read as corrected below.

Column 4, lines 7 to 13, the formula should appear as shown below instead of as in the patent:

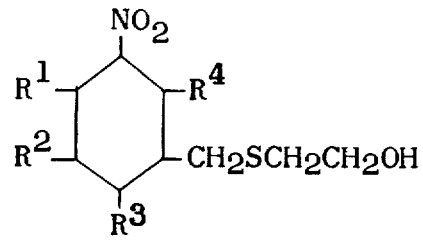

lines 15 and 38, for "halogen", each occurrence, read -- chlorine, bromine --.

Signed and sealed this 19th day of June 1962.

(SEAL)
Attest:

ERNEST W. SWIDER                                      DAVID L. LADD
Attesting Officer                                          Commissioner of Patents